United States Patent
Sonnekalb

(10) Patent No.: US 8,199,914 B2
(45) Date of Patent: Jun. 12, 2012

(54) DETECTION OF A CHANGE OF THE DATA OF A DATASET

(75) Inventor: Steffen Marc Sonnekalb, Taufkirchen (DE)

(73) Assignee: Infineon Technologie AG (DE)

( * ) Notice: Subject to any disclaimer, the term of this patent is extended or adjusted under 35 U.S.C. 154(b) by 1133 days.

(21) Appl. No.: 11/480,826

(22) Filed: Jul. 6, 2006

(65) Prior Publication Data

US 2007/0016768 A1 Jan. 18, 2007

(30) Foreign Application Priority Data

Jul. 6, 2005 (DE) .......................... 10 2005 031 611

(51) Int. Cl.
*H04L 9/00* (2006.01)
*H04K 1/04* (2006.01)
(52) U.S. Cl. .......... 380/263; 380/217; 380/37; 713/160; 714/2
(58) Field of Classification Search ...... 714/6; 380/209, 380/239, 269, 267, 263
See application file for complete search history.

(56) References Cited

U.S. PATENT DOCUMENTS

| | | | | |
|---|---|---|---|---|
| 5,388,209 A | * | 2/1995 | Akagiri ........................ | 704/229 |
| 5,586,185 A | * | 12/1996 | Shibata et al. ................ | 380/264 |
| 6,047,069 A | * | 4/2000 | Hogan ........................... | 380/268 |
| 6,907,125 B1 | * | 6/2005 | Oishi ............................. | 380/239 |
| 7,278,025 B2 | * | 10/2007 | Saito et al. .................... | 713/185 |
| 7,680,273 B2 | * | 3/2010 | Whitehead et al. ............. | 380/46 |
| 2001/0018741 A1 | | 8/2001 | Hogan | |
| 2002/0048364 A1 | * | 4/2002 | Gligor et al. ................... | 380/37 |
| 2002/0120901 A1 | | 8/2002 | Poirier et al. | |
| 2003/0188148 A1 | * | 10/2003 | Logalbo et al. ............... | 713/150 |
| 2005/0271246 A1 | | 12/2005 | Sharma et al. | |

FOREIGN PATENT DOCUMENTS

| | | |
|---|---|---|
| DE | 102 39 062 A1 | 4/2004 |
| DE | 103 45 385 A1 | 6/2005 |
| EP | 1 128 588 A1 | 8/2001 |
| WO | WO 9624129 A1 * | 8/1996 |
| WO | WO-00/21210 A1 | 4/2000 |
| WO | WO 0021210 A1 * | 4/2000 |

* cited by examiner

*Primary Examiner* — Taghi Arani
*Assistant Examiner* — Mohammad Rahman
(74) *Attorney, Agent, or Firm* — Dickstein Shapiro LLP

(57) ABSTRACT

An undesired change of encrypted data words of a stored encrypted dataset may be concluded from the fact that redundancy information is associated with the data words of a dataset prior to encryption, wherein the redundancy information is also encrypted and stored at least partially together with the encrypted data words of the encrypted dataset as an encrypted redundancy data word. The change of the stored encrypted data words may be concluded from the fact that the decrypted data words resulting from decrypting the encrypted data words are used to form a new redundancy data word which is encrypted into a new encrypted redundancy data word. A comparison of the new encrypted redundancy data word to the encrypted redundancy data word enables to examine whether the encrypted data was changed.

29 Claims, 2 Drawing Sheets

DETECTION OF A CHANGE OF THE DATA OF A DATASET

CROSS-REFERENCE TO RELATED APPLICATION

This application claims priority from German Patent Application No. 102005031611.5, which was filed on Jul. 6, 2005, and is incorporated herein by reference in its entirety.

BACKGROUND OF THE INVENTION

1. Field of the Invention

The present invention relates to a device and a method for the detection of a change of the data of a dataset which may for example be applied in the processing or storing of data in a data processing system for securing data integrity.

2. Description of Related Art

In many application scenarios it is desirable to protect stored data from the access of unauthorized persons, which is why the same are encryptedly stored in a memory. In particular, security applications today require the protection of data by an encryption unit. Apart from that it has to be guaranteed that read data is correct, i.e. that the same was not changed before reading. Data may for example be changed during its transfer via a bus system or during its retention time in the memory by randomly occurring errors like the toggling of an individual bit. Further, also the protection of data processing units against misconduct (by attacks on the data processing unit) gains evermore importance. An attacker who wants to affect the security of a data processing system by an attack will willfully change stored data and in doing so usually change more than one bit of a data word which was stored or transmitted via a bus. In addition to the encryption of the data it is also required to detect a random or willfully caused change of data.

The encryption of data before storing or before transferring the same via a bus system, respectively, is here performed by an encryption unit (MED) which encrypts individual data words of a fixed, system-dependent word length into encrypted data words of the same word length according to a cryptographic algorithm.

Due the necessity to detect data changes and correct individual bit errors, up to now an error correction polynomial (ECC polynomial; ECC=error correction code) or another error correction method based on a redundancy formation is applied to the already encrypted data. By the application of the error correction mechanisms after the encryption by the encrypting MED, the MED itself is generally not protected, or has to be examined by expensive additional hardware, respectively. In addition, for the implementation of the error correction a dedicated extra hardware is required after the encryption. By the method applied so far, the required hardware is thus clearly increased regarding its extent and the current consumption of a data processing means is increased by the additional hardware, respectively, which is among others to be prevented with regard to a possible use in mobile terminal devices.

The German patent application 10 2005 001953.6 describes a method and a device in which the redundancy information, i.e. the error correction information, is formed by a bit-wise exclusive-OR operation of the individual data words of a dataset even before the encryption of the data words by the MED. The error code word or the redundancy information, respectively, in this method comprises the same word length as the data words and the MED. In the method described in DE 10 2005 001953.6, the error code word may be transmitted or stored, respectively, in an encrypted or non-encrypted way together with the data words of a dataset, whereby the detection of changes of the data when transferring or storing the same is enabled and the change of one of the data words of a dataset by one individual bit may be corrected. The method proposed in DE 10 2005 001953.6 has the disadvantage, however, that without changing the hardware no error codes smaller than the data width or the word length of the MED, respectively, may be generated. This is in particular disadvantageous if the individual protection requirements might already be achieved using a lower bit count of the error code. In order to achieve a lower bit count of the error code, either massive changes have to be performed at the encryption unit, or the actually superfluous bits of the error code have to be stored together with the data words, which clearly increases the memory requirements. This is for example a disadvantage for mobile applications or applications in the embedded area where often only limited memory space is available.

In the existing solutions, thus in the implementation of an error correction code or a flexible adaptation of the scope of protection to the security requirements, a significant change or expansion of the existing hardware is necessary.

SUMMARY OF THE INVENTION

The present invention provides a more efficient device and a method by which the change of data in a memory or during the data processing may be detected.

In accordance with a first aspect, the present invention provides a device for handling data words of a dataset, having a redundancy former which is implemented to determine a redundancy word associated with the dataset from the data words of the dataset; an encrypter which is implemented to encrypt the data words into encrypted data words and to encrypt the redundancy data word into an encrypted redundancy data word; and a processor for processing the encrypted data words and the encrypted redundancy data word discarding predetermined bits of the encrypted redundancy data word.

In accordance with a second aspect, the present invention provides a device for handling encrypted data words of an encrypted dataset, having a provider for providing the encrypted data words of the encrypted dataset and an encrypted redundancy data word, which is associated with the encrypted data words; a decrypter which is implemented to decrypt the encrypted data words of the encrypted dataset into decrypted data words of a decrypted dataset; a redundancy former which is implemented to form a new redundancy data word from the decrypted data words which is associated with the decrypted data words; an encrypter which is implemented to form a new encrypted redundancy data word from the new redundancy data word; and a comparator for performing at least a partial comparison between the encrypted redundancy data word and the new encrypted redundancy data word.

In accordance with a third aspect, the present invention provides a system for a secure handling of datasets, having an encrypter/decrypter which is implemented to form encrypted data words from data words of a dataset, to form an encrypted redundancy data word from a redundancy data word associated with the data words and to form a new encrypted redundancy data word from a new redundancy data word, wherein the encrypter/decrypter is further implemented to form decrypted data words from encrypted data words; a redundancy former which is implemented to form the redundancy data word from the data words and to form the new redundancy data word from the decrypted data words; and a comparator for performing at least a partial comparison between the encrypted redundancy data word and the new encrypted redundancy data word.

In accordance with a fourth aspect, the present invention provides a method for handling data words of a dataset, with the steps of determining a redundancy data word from the data words of the dataset, which is associated with the dataset; encrypting the data words into encrypted data words and encrypting the redundancy data word into an encrypted redundancy data word; and processing the encrypted data words and the encrypted redundancy data word discarding predetermined bits of the encrypted redundancy data word.

In accordance with a fifth aspect, the present invention provides a method for handling encrypted data words of an encrypted dataset, with the steps of providing the encrypted data words of the encrypted dataset and an encrypted redundancy data word which is associated with the encrypted data words; decrypting the encrypted data words of the encrypted dataset into decrypted data words of a decrypted dataset; forming a new redundancy data word from the decrypted data words which is associated with the decrypted data words; encrypting the new redundancy data word into a new encrypted redundancy data word; and performing at least a partial comparison between the encrypted redundancy data word and the new encrypted redundancy data word.

In accordance with a sixth aspect, the present invention provides a computer program having a program code for performing one of the above-mentioned methods, when the computer program runs on a computer.

A central idea of the present invention is, that a change of encrypted data words of an encrypted dataset may be concluded from the fact that redundancy information is associated with the data words of a dataset, on which the encrypted dataset is based, prior to encryption, wherein the redundancy information is also encrypted and at least partially stored as an encrypted redundancy data word together with the encrypted data words of the encrypted dataset. The change of the stored encrypted data words may be concluded by using the decrypted data words which resulted from decrypting the encrypted data words in order to form a new redundancy data word which is encrypted into a new encrypted redundancy data word. A comparison of the new encrypted redundancy data word to the encrypted redundancy data word makes it possible to examine whether the encrypted data was changed. By the fact that the consistency test is performed by comparing the error correction words after their encryption, using an encryption hardware a strong error protection is enabled, wherein only few additional hardware components are required. In other words, it is already sufficient according to the invention to only store a part of the encrypted redundancy data word when storing or filing the encrypted data words, as it is possible anyway to examine whether the encrypted data was changed by use of an only partially stored redundancy data word.

In one embodiment of the present invention, first of all redundancy information in the form of a redundancy data word is added to a dataset consisting of several data words. Before storing the dataset and the associated redundancy data word, the data words are encrypted word by word by an encryption means (MED), wherein also the redundancy data word is encrypted.

When reading the data, now using the encryptedly stored redundancy data word, it may be determined, whether the stored data was changed during its retention time in the memory. For that purpose, first of all the encrypted data words of the dataset and the encrypted redundancy data word are read from the memory, the encrypted redundancy data word is buffered for a further use and the encrypted data words are decrypted by the MED. Whether the encrypted data words were changed during the retention time in the memory, i.e. whether the read decrypted data words may be regarded to be integer, may be checked by forming a new redundancy data word from the decrypted data words which is encrypted by the MED. With a match of this new encrypted redundancy data word with the encrypted redundancy data word it is assumed that the encrypted data words were not changed or manipulated during their retention time in the memory.

In the above-described embodiment of the present invention, the MED hardware itself is used to enable a high error protection. By forming the redundancy before the encryption by the MED, here even errors occurring in the MED operation itself are detected.

In a further embodiment of the present invention the redundancy information is formed by linking the individual data words of a dataset bit by bit to each other by an exclusive OR operation, so that a redundancy data word results which corresponds to the length of the data words. By this simple form of the redundancy formation by means of an exclusive OR operation only a minimum additional hardware expense is required and thus a small integrated solution results which may be integrated completely into the normal data flow of existing systems. By this very small additional hardware expense an error protection is enabled which substantially uses the MED hardware itself and causes no significant increase of the current consumption and does not generate any significant current peaks in the operation, respectively.

In a further embodiment of the present invention, the encrypted redundancy data word is shortened by a user-determinable number of bits before storing the same, so that a shortened encrypted redundancy data word results, which is stored together with the encrypted data words of the encrypted dataset. The length of the shortened encrypted redundancy data word here depends on the desired scope of protection, i.e. on the probability with which a stored dataset of encrypted data words may be changed so that a new redundancy data word is formed from the changed decrypted data words which corresponds to the stored encrypted redundancy data word after the encryption and clipping. The smaller this probability is, the greater the scope of protection.

By the present invention thus advantageously an error code of any size may be generated without changes having to be performed at the encryption/decryption unit MED itself. This is especially advantageous, for example, when several memory areas having different security requirements (i.e. redundancy data word lengths or code lengths, respectively) exist in parallel in a data processing system. Already existing hardware designs may easily be modified in order to implement the additional functionality of the error correction.

With high protection requirements the code length may in principle be easily increased by forming several independent redundancy data words in different ways from the data words of the dataset during the redundancy formation. These independent redundancy data words are then encrypted word by word and cut to the desired length, wherein with the increase of the redundancy information also the scope of protection is increased. Thereby, the scope of protection may be freely determined in a virtually random way.

BRIEF DESCRIPTION OF THE DRAWINGS

In the following, preferred embodiments of the present invention are explained in more detail with reference to the accompanying drawings, in which.

DESCRIPTION OF THE PREFERRED EMBODIMENTS

Figure 1:
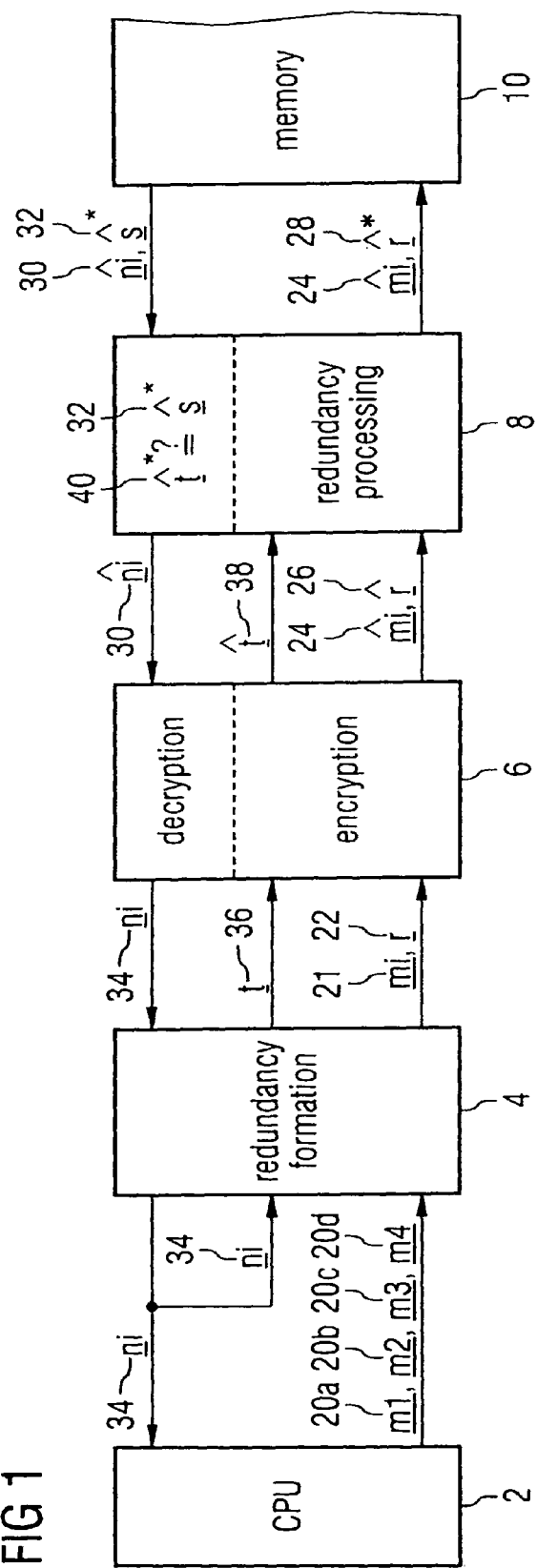
FIG. 1 shows a system for securely storing and reading data.

By use of the schematical illustration in FIG. 1, in the following the functioning of the inventive system for a secure handling of data is to be illustrated. FIG. 1 shows a processor 2, a redundancy means 4, an encryption/decryption means 6, a redundancy processing means 8 and a data storage 10.

The processor 2 processes or generates data words, respectively, which are to be secured against errors and filed in the memory 10 or read from the same, respectively, in an encrypted way. For this process, the processor 2 is connected to the redundancy means 4 via data connections enabling both transmitting or also receiving data, which is connected to the encryption/decryption means 6 which is again connected to the redundancy processing means 8, wherein the redundancy processing means 8 is connected to the data memory 10.

In the following, first of all the functioning of the inventive device when writing data into the memory is to be described. For this purpose, first of all the four data words 20a to 20d of a dataset 21 are generated by the processor 2 which are to be stored in the data memory 10, wherein in the inventive embodiment described here, a dataset 21 to be stored consists of exactly four data words 20a to 20d. The data words 20a to 20d are first transmitted to the redundancy means 4, wherein the redundancy means 4 forms an error code word 22 which is associated with the dataset 21 from the data words 20a to 20d. At that, this redundancy or error code formation, respectively, may be performed by any suitable error code mechanism. After forming the error code word 22 the data words 20a to 20d of the dataset 21 and the error code word 22 are transmitted to the encryption/decryption means 6 by which they are encrypted word by word into the encrypted data words of an encrypted dataset 24 and into an encrypted error code word 26 by a predetermined encryption method.

The encrypted dataset 24 and its associated encrypted error code word 26 are thereupon transmitted to the redundancy processing means 8 which discards a predetermined number of bits of the encrypted error code word 26 at the end of the encrypted error code word 26, so that the encrypted dataset 24 and a reduced encrypted error code word 28 are provided at the output of the redundancy processing means 8, wherein the encrypted dataset 24 is stored in the memory 10 together with its associated reduced encrypted error code word 28.

The inventive process has the advantage that the available memory area may be used best, as the required memory area scales according to the invention using the desired scope of protection, as it is briefly explained in the following.

The encryption means naturally works with a word width which corresponds to the width of the data words to be encrypted. Up to now it was of course possible to generate an error code of a smaller length than the word width of the encryption means. The same had to be stored in an unencrypted way, however, due to the above limitation, which obviously has negative consequences for data security. If the error code is to be stored in an encrypted way, the error code length according to the prior art at least had to correspond to the word length of the MED (or be an integer multiple of the same), even if the required scope of protection may in principle be achieved with a smaller word width.

The present invention now advantageously enables both to store the error code in an encrypted way and also to randomly adapt its length to the protection requirement. In this context it is to be noted again, that proportional to the increase of the number of bits discarded in the transition from the encrypted error code 26 to the reduced encrypted error code word 28, the scope of protection of the inventive device is decreased.

The reading of data stored in an encrypted way and the examination, whether data stored in the memory were changed, is briefly explained in the following. For this purpose, first of all an encrypted dataset 30 and its associated reduced encrypted error code word 32 is read from the memory 10. At that, in FIG. 1 the encrypted dataset 24 ( ) which was stored during the storing process in the memory 10 and its associated reduced encrypted error code word 28 ( ) are provided with a notation deviating from the read dataset 320 ( ) and the read reduced encrypted error code word 32 ( ), in order to indicate the possibility that both the originally stored data words of the encrypted dataset 24 and also the originally stored reduced encrypted error code word 28 were changed during their retention time in the memory 10.

In the read operation, the encrypted dataset 30 and the reduced encrypted error code word 32 are first transmitted from the memory 10 into the redundancy processing means 8 which buffers the reduced encrypted error code word 32 and transmits the encrypted dataset 30 to the encryption/decryption means 6.

The encryption/decryption means 6 decrypts the data words of the encrypted dataset 30 word by word into decrypted data words of a decrypted dataset 34, whereupon the decrypted dataset 34 is transferred to the redundancy means 4.

The same on the one hand transmits the decrypted dataset 34 to the processor 2 and on the other hand processes the decrypted dataset 34 in order to form a test error code word 36 associated with the decrypted dataset 34.

The test error code word 36 is thereupon transferred to the encryption/decryption means 6 which forms an encrypted test error code word 38 from the test error code word 36. The encrypted test error code word 38 is then transmitted to the redundancy processing means 8, which discards the predetermined number of bits of the encrypted test error code word 38 and forms the reduced encrypted test error code word 40 from the same.

The decision whether the encrypted dataset 30 or its associated reduced encrypted error code word 32 were changed during their retention time in the data memory 10 may now be determined by a comparison of the reduced encrypted error code word 32 and the reduced encrypted test error code word 40. If the reduced encrypted error code word 32 and the reduced encrypted test error code word 40 are identical, then it is assumed that in the data memory 10 neither the encrypted dataset 30 nor the reduced encrypted error code word 32 were changed, i.e. that the decrypted dataset 34 which was transmitted to the processor is non-manipulated and may securely be used.

In the cycle of read and write described in FIG. 1, with a match of the reduced encrypted error code word 32 and the reduced encrypted test error code word 40, consequently no error occurred and the encrypted dataset 24 and the reduced encrypted error code word 28 are identical with the read encrypted dataset 30 and its associated reduced encrypted error code word 32, i.e. the data is unmanipulated.

If the comparison between the reduced encrypted test error code word 40 and the reduced encrypted error code word 32 indicates that the two code words are different, suitable measures may be taken, e.g. the discarding of the decrypted dataset 34 may be triggered.

In the present invention, the strong non-linearities and bit-dependencies of the encryption/decryption means 6 (MED) are used in order to establish a strong error protection in a simple way both for the encrypted data and also for the decryption operation and the encryption operation itself. At that, primarily the encryption/decryption means 6 (MED) itself is used and only a small extra part of hardware is required to perform the actual correctness test. The error test itself does not require more time here than a normal encryption operation.

The special advantage here is on the one hand that only little additional hardware has to be implemented for an error testing and that by applying the redundancy before the actual encryption both the encryption process and also the decryption process are protected, during which in principle erroneous bit transactions may result.

It is a further substantial advantage that the scope of protection may variably be adapted to the protection requirement by the user across the length of the reduced encrypted error code word 28, without having to modify the actual encryption/decryption unit 6. Here, on the one hand with a reduced scope of protection a substantial memory area saving in the data memory 10 is possible, as the length of the reduced encrypted error code word 28 is substantially smaller than the length of the data word of the encrypted dataset 24. It is thus even possible by the inventive device to realize different levels of error protection with different sensitive data in different memory areas of the data memory 10 within a data processing system.

If an MED is used in which the generation of the encrypted key depends on the physical memory address, at which a data word is to be stored in the data memory 10, then the selection of the data word to be read out, i.e. the addressing of the memory area in the data memory 10 itself, is additionally protected by the present invention, as also with an erroneous address indication, the reduced encrypted test error code word 40 does not match the reduced encrypted error code word 32 any more which is directly read from the memory.

Figure 2:
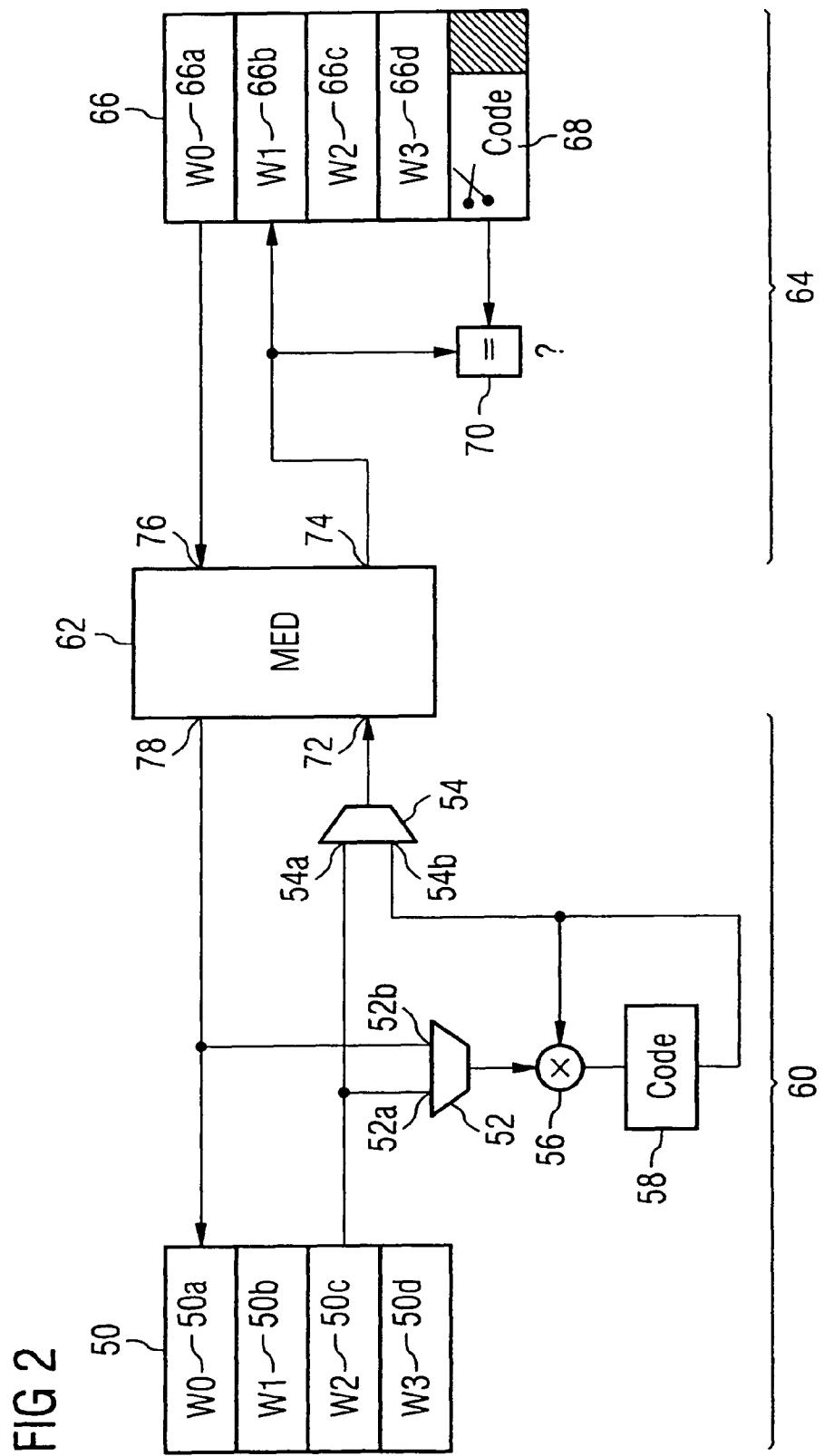
FIG. 2 shows a hardware implementation of a system for securely storing and reading data.

FIG. 2 shows a system for securely writing and reading data and the implementation of the same using the strongly non-linear characteristics of an encryption/decryption unit MED.

FIG. 2 shows a non-encrypted dataset 50 consisting of four non-encrypted data words 50a to 50d, a first multiplexer 52 having a first data input 52a and a second data input 52b, a second multiplexer 54 having a first data input 54a and a second data input 54b, a linking means 56 and a latch 58 on a non-encrypted side 60 of the data path. Further, an encryption/decryption means 62 is illustrated which separates the non-encrypted side 60 from an encrypted side 64 of the data path. On the encrypted side 64 an encrypted dataset 66 consisting of four encrypted data words 66a to 66d, an encrypted error code word 68 associated with the encrypted dataset 66 and a code comparison means 70 are shown.

Via a data connection, the non-encrypted data words 50a to 50d of the non-encrypted dataset may be transmitted to the first data input 52a of the first multiplexer 52 and to the first data input 54a of the second multiplexer 54. The data output of the first multiplexer 52 is connected to one of two data inputs of the linking means 56, the data output of the linking means 56 is connected to the data input of the latch 58, wherein the data output of the latch 58 is connected both to a second data input of the linking means 56 and also to the second data input 54b of the second multiplexer 54. The data output of the second multiplexer 54 is connected to an encrypted data input 72 of the encryption/decryption means 62. Via an encrypted data output 74 of the encryption/decryption means 62, encrypted data words and also encrypted data words 66a to 66d of the encrypted dataset 66 may be stored and also be transmitted to one of two data inputs of the code comparison means 70. The encrypted data words 66a to 66d and the encrypted error code word may be transmitted to a decrypting data input 76 of the encryption/decryption means 62, a decrypted data output 78 of the encryption/decryption means 62 is on the one hand connected to the second data input 52b of the first multiplexer 52 and on the other hand decrypted data words from the decrypted data output 78 may be used to form the complete non-encrypted dataset 50 consisting of the four non-encrypted data words 50a to 50d.

In the embodiment of the present invention described in FIG. 2, the redundancy data word is formed by a simple, bit-wise exclusive OR operation of the non-encrypted data words 50a to 50d. During four of the first steps of a complete write operation, first of all the four non-encrypted data words 50a-50d are encrypted and stored as encrypted data words 66a-66d, wherein simultaneously an error code word is created from the four non-encrypted data words 50a to 50d, which is in a fifth step also encrypted and stored as an encrypted error code word 68.

During the first four steps of the write operation the first multiplexer 52 is switched so that the non-encrypted data words 50a to 50d applied to its first data input 52a are passed on to the data output of the multiplexer 52, the second multiplexer 54 is operated so that the non-encrypted data words 50a to 50d applied to its first data input 54a are switched through to its data output, i.e. that the same are applied to the encrypting data input 72 of the encryption/decryption means 62. The linking means 56 is implemented so that it transforms the data words applied to its two data inputs by means of a bit-wise exclusive OR operation into a new data word, which is then available at the data output of the linking means 56 and stored in the latch 58. At that, the data word stored in the latch 58 is used as an input data word of the linking means 56. During the first four steps of the storing process, via the second multiplexer 54 the individual non-encrypted data words 50a to 50d are consequently encrypted by the encryption/decryption means 62 and stored as encrypted data words 66a to 66d. Simultaneously with encrypting and storing the decrypted data words 50a to 50d, an error code word is determined from the same, as it is described in the following.

During the first step of the storing process, the first non-encrypted data word 50a is applied to the first data input of the linking means 56 via the multiplexer 52, where it is subjected to a bit-wise XOR operation with a data word which has the same length as the non-encrypted data word 50a whose bits are all zero, however. Thus, the data word 50a is not changed in the first step, it is output unchanged at the data output of the linking means 56 and stored in the latch 58. In the second step, the second non-encrypted data word 50b is applied to the first input of the linking means 56, wherein now at the second input of the linking means 56 the first data word 50a stored in the latch 50a is applied. By this, now a data word is provided at the data output of the linking means 56 and stored in the latch 58, which is formed by a bit-wise exclusive OR operation of the data words 50a and 50b. After completing the fourth step, a data word is located in the latch 58 which was generated by a bit-wise XOR operation of the four non-encrypted data words 50a to 50d of the non-encrypted dataset 50, i.e. which corresponds to the desired error code word. In the fifth step of data storing, now the second multiplexer 54 is switched so that the error code word applied to its second data input 54b is switched to the data output of the multiplexer 54, so that the same is applied to the encrypting data input 72 of the encryption/decryption means 62 in order to also encrypt the error code word.

In the embodiment shown in FIG. 2, after the encryption, the error code word is additionally shortened by a predetermined number of the last bits, so that the encrypted error code word 68 results which is associated with the encrypted data words 66a to 66d of the encrypted dataset 66 and using which it may be tested during reading whether the non-encrypted data words 50a to 50d were changed during the encryption or the transfer via a data connection, i.e. whether the data integrity is secure. Reading the data and testing the integrity of the data is in the following described with reference to FIG. 2.

The read operation, just like the write operation, may be separated into five logical steps. During the first four steps the encrypted data words 66a to 66d are decrypted via the decrypting data input 76 of the encryption/decryption means 62 in order to thus form the decrypted dataset 50. Simultaneously, from the decrypted read data words 50a-50d a new error code word is determined in the same way as it was already described in the write operation. For this purpose, the first multiplexer 52 is switched so that the data words applied to its second data input 52b are switched through to the data output of the multiplexer 52, so that during the four first read steps a new error code word is formed by a bit-wise XOR operation of the decrypted read data words. In the fifth step of the read operation, the new error code word is passed on via the second multiplexer 54 to the encrypting input 72 of the encryption/decryption means 62 which encrypts the new error code word into a new encrypted error code word. The new encrypted error code word is thereupon shortened by the same number of bits as it was the case for the encrypted error code word 68 when writing. The code comparison means 70 compares the data words applied to its two data inputs, the new encrypted error code word and the encrypted error code word 68 which was generated during writing the encrypted dataset 66. If the new encrypted error code word and the encrypted error code word 68 match, it is assumed, that the read decrypted data of the encrypted dataset 66 correspond to the original, non-encrypted data words 50a to 50d of the non-encrypted dataset 50, i.e. that the data integrity was maintained during the whole read and write process.

As it may be seen with reference to FIG. 2, the extension of an existing system for encrypting and decrypting data by the functionality of error detection is possible with a very small additional hardware expense, so that little additional area is consumed on a silicon chip and only a minimum increased current consumption results.

By the skillful parallel generation of the error code word and the storage of the encrypted data, by the error detection possibility only a little additional time expense results, which here mainly depends on the duration of an encryption operation of the encryption/decryption means 62.

Although in the embodiment of the present invention described in FIG. 2 the generation of the error code word is performed by a simple XOR operation of the non-encrypted data words 50a to 50d, also any other form of creating an error code word is suitable to guarantee the integrity of the data according to the invention. Thus, for example, the application of an error correction polynomial or the use of hardware-efficient Hsiao codes is possible.

According to the individual requirements of data security, it is possible using the inventive device for handling data to vary the scope of protection. The principle illustrated in the preferred embodiment of the present invention in FIG. 2, especially with codes of a smaller length than the word width of the encryption/decryption means 62 (MED), is to generate a link of the clear text data to a code word of the width of the MED (preferably an XORing of all words, also the application of "real" error codes is possible, of course). This word is then simply encrypted and thereupon cut to the selected shorter length (e.g. by discarding the top n MSBs). The thus generated code word is then stored. If the encrypted data is read and decrypted now, the correctness of the data may be determined by the renewed linking of the clear text data to a code word, its encryption, clipping and subsequent comparison to the stored code word. For a desired greater scope of protection, i.e. for larger codes, in an alternative implementation of the present invention, the clear text data is simply linked in different ways. The resulting n code words are thereupon encrypted as described above, cut to the required overall length and stored. Testing with regard to data integrity is here performed in an equivalent way as it was already described with reference to the embodiment in FIG. 2.

In addition to that, it is possible using an inventive device for handling data, to correct a one bit error which occurred in the encrypted data, if the clipping of at least one encrypted error code word is omitted. Here, the high non-linearity of an MED is used to implement an error code which additionally offers the possibility to quickly correct a one bit error.

Although in the embodiment of FIG. 1 a complete system for reading and for storing data was described, in an alternative embodiment of the present invention merely the write functionality may be implemented, for example to securely store data for a later use. Consequently, in FIG. 1 the decryption function of the encryption/decryption means 6 may be completely omitted, the redundancy processing means 8 is here merely limited to the function to discard the desired number of bits of the encrypted error code word 26 in order to form the reduced encrypted error code word 28 which may then be stored into a non-volatile memory together with the encrypted dataset 24. The thus stored data may for example be transferred with the memory medium, wherein it may be guaranteed by a later readout that the data was not manipulated during its transport.

In a further advantageous embodiment of the present invention it is thus advantageous to implement the read functionality of the system for a secure storing and reading data only in hardware. Thus, it may for example be examined, whether data which is provided on a data carrier was manipulated during its transfer or during the transport, respectively, or not. For this purpose, encrypted data words of an encrypted dataset 30 have to be decrypted by the encryption/decryption means 6 in order to obtain a decrypted dataset 34. Additionally, the reduced encrypted error code word 32 read from the memory 10 has to be latched by the redundancy processing means 8, the redundancy formation means 4 in FIG. 1 is required for reading, in order to form a test error code word 36 from the decrypted data words of the decrypted dataset 34, which is compared to the reduced encrypted error code word 32 by the redundancy processing means 8, after the encryption by the encryption/decryption means 6 and a subsequent clipping to the desired length, in order to thus detect a possible change of the data.

Depending on the conditions, the inventive method for detecting a change of the data of a dataset may be implemented in hardware or in software. The implementation may take place on a digital storage medium, in particular a floppy disc or a CD having electronically readable control signals which may cooperate with a programmable computer system so that the inventive method for detecting a change of the data of a dataset is performed. In general, the invention thus also consists in a computer program product having a program code stored on a machine-readable carrier for performing the inventive method, when the computer program product runs on a computer. In other words, the invention may thus also be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A device for handling data words of a dataset, comprising
    a microprocessor configured to:
    determine a redundancy word associated with the dataset from the data words of the dataset;
    non-linearly encrypt the data words into separate encrypted data words word by word and to encrypt the redundancy data word into a separate encrypted redundancy data word; and
    process the encrypted data words and the encrypted redundancy data word, and discard predetermined bits of the encrypted redundancy data word, by storing the encrypted data words and the encrypted redundancy data word into a memory or transmitting the same via a data bus after processing, wherein the predetermined bits to be discarded are not stored and transmitted, respectively.

2. The device according to claim 1, wherein the microprocessor is implemented to form the redundancy data word by a bit-wise exclusive OR operation of all data words of the dataset.

3. The device according to claim 1, wherein the microprocessor is implemented to encrypt the data words and the redundancy data word depending on a memory address.

4. The device according to claim 1, wherein the microprocessor is implemented to discard a predetermined number of the last bits of the encrypted redundancy data word.

5. The device according to claim 1, wherein the microprocessor is implemented to determine a plurality of redundancy data words from the data words of the dataset, and form a plurality of encrypted redundancy data words from the plurality of redundancy data words, wherein the microprocessor is implemented to process the plurality of encrypted redundancy data words respectively using predetermined bits of the individual redundancy data words.

6. A device for handling encrypted data words of an encrypted dataset, comprising
    a microprocessor configured to:
    provide the encrypted data words of the encrypted dataset and an encrypted redundancy data word, which is associated with the encrypted data words;
    non-linearly decrypt the encrypted data words of the encrypted dataset into decrypted data words of a decrypted dataset word by word;
    form a new redundancy data word from the decrypted data words which is associated with the decrypted data words;
    non-linearly encrypt the new redundancy data word into a new encrypted redundancy data word;
    discard predetermined bits of the new encrypted redundancy data word to provide a reduced new encrypted redundancy data word;
    perform at least a partial comparison between the encrypted redundancy data word and the reduced new encrypted redundancy data word; and
    make an assumption that the encrypted data words were not manipulated in case of the comparison resulting in a match.

7. The device according to claim 6,
    wherein the microprocessor is additionally implemented to provide the encrypted redundancy data word by discarding the predetermined bits of a complete encrypted redundancy data word.

8. The device according to claim 6, wherein the microprocessor is implemented to form the new redundancy data word by a bit-wise exclusive OR operation from the decrypted data words.

9. The device according to claim 6, wherein the microprocessor is implemented to read the encrypted data words and the encrypted redundancy data word from a memory or receive the same via a data bus.

10. The device according to claim 6, wherein the microprocessor is implemented to decrypt the encrypted data words depending on a memory address and form the new encrypted redundancy data word depending on a memory address.

11. The device according to claim 6, wherein the microprocessor is implemented to provide the encrypted redundancy data word by discarding a predetermined number of the last bits of a complete encrypted redundancy data word, and leave the predetermined number of the last bits of the encrypted redundancy data word and the new encrypted redundancy data word unnoticed in the comparison between the encrypted redundancy data word and the new encrypted redundancy data word.

12. A computer system for a secure handling of datasets, comprising
    a microprocessor configured to:
    non-linearly form, word by word, encrypted data words from data words of a dataset, to form a separate encrypted redundancy data word from a redundancy data word associated with the data words, form a new encrypted redundancy data word from a new redundancy data word, and non-linearly form, word by word, decrypted data words from encrypted data words;
    form the redundancy data word from the data words and to form the new redundancy data word from the decrypted data words;
    discard predetermined bits of the encrypted redundancy data word to form a reduced encrypted redundancy data word and to discard predetermined bits of the new encrypted redundancy data word to form a reduced new encrypted redundancy data word; and
    perform at least a partial comparison between the reduced encrypted redundancy data word and the reduced new encrypted redundancy data word,
    wherein the computer system is configured to assume that the encrypted data words were not manipulated in case of the comparison resulting in a match.

13. A method for handling data words of a dataset, comprising:
    determining a redundancy data word from the data words of the dataset, which is associated with the dataset;
    non-linearly encrypting the data words, word by word, into separate encrypted data words and encrypting the redundancy data word into a separate encrypted redundancy data word;
    processing the encrypted data words and the encrypted redundancy data word, and discarding predetermined bits of the encrypted redundancy data word; and storing the encrypted data words and the encrypted redundancy data word or transmitting the same after processing, wherein the predetermined bits to be discarded are not stored and transmitted, respectively.

14. A method for handling encrypted data words of an encrypted dataset, comprising:
providing the encrypted data words of the encrypted dataset and an encrypted redundancy data word which is associated with the encrypted data words;
non-linearly decrypting the encrypted data words of the encrypted dataset into decrypted data words of a decrypted dataset word by word;
forming a new redundancy data word from the decrypted data words which is associated with the decrypted data words;
non-linearly encrypting the new redundancy data word into a new encrypted redundancy data word;
discarding predetermined bits of the new encrypted redundancy data word to provide a reduced new encrypted redundancy data word; and
performing at least a partial comparison between the encrypted redundancy data word and the reduced new encrypted redundancy data word, with assuming that the encrypted data words were not manipulated in case of the comparison resulting in a match.

15. A non-transitory computer readable storage medium having stored thereon a computer program having a program code for performing the method for handling data words of a dataset, comprising:
determining a redundancy data word from the data words of the dataset, which is associated with the dataset;
non-linearly encrypting the data words, word by word, into separate encrypted data words and encrypting the redundancy data word into a separate encrypted redundancy data word;
processing the encrypted data words and the encrypted redundancy data word, and discarding predetermined bits of the encrypted redundancy data word; and
storing the encrypted data words and the encrypted redundancy data word or transmitting the same after processing, wherein the predetermined bits to be discarded are not stored and transmitted, respectively,
when the program code runs on a computer.

16. A non-transitory computer readable storage medium having stored thereon a computer program having a program code for performing the method for handling encrypted data words of an encrypted dataset, comprising:
providing the encrypted data words of the encrypted dataset and an encrypted redundancy data word which is associated with the encrypted data words;
non-linearly decrypting the encrypted data words of the encrypted dataset into decrypted data words of a decrypted dataset word by word;
forming a new redundancy data word from the decrypted data words which is associated with the decrypted data words;
non-linearly encrypting the new redundancy data word into a new encrypted redundancy data word;
discarding predetermined bits of the new encrypted redundancy data word to provide a reduced new encrypted redundancy data word; and
performing at least a partial comparison between the encrypted redundancy data word and the new encrypted redundancy data word, with assuming that the encrypted data words were not manipulated in case of the comparison resulting in a match,
when the program code runs on a computer.

17. A device for handling data words of a dataset, comprising:
a redundancy forming means for determining a redundancy word associated with the dataset from the data words of the dataset;
an encryption means for non-linearly encrypting the data words into separate encrypted data words word by word and for encrypting the redundancy data word into a separate encrypted redundancy data word; and
a processing means for processing the encrypted data words and the encrypted redundancy data word, and for discarding predetermined bits of the encrypted redundancy data word,
wherein each of the redundancy forming means, the encryption means and the processing means comprises a hardware implementation, and
wherein the processing means is further for storing the encrypted data words and the encrypted redundancy data word into a memory or for transmitting the same via a data bus after processing, wherein the predetermined bits to be discarded are not stored and transmitted, respectively.

18. A device for handling encrypted data words of an encrypted dataset, comprising:
a providing means for providing the encrypted data words of the encrypted dataset and an encrypted redundancy data word, which is associated with the encrypted data words;
a decrypting means for non-linearly decrypting the encrypted data words of the encrypted dataset into decrypted data words of a decrypted dataset word by word;
a redundancy forming means for forming a new redundancy data word from the decrypted data words which is associated with the decrypted data words;
an encryption means to non-linearly encrypt the new redundancy data word into a new encrypted redundancy data word;
a processing means which is implemented to discard predetermined bits of the new encrypted redundancy data word to form a reduced new encrypted redundancy data word; and
a comparison means for performing at least a partial comparison between the encrypted redundancy data word and the reduced new encrypted redundancy data word,
wherein the device is configured to assume that the encrypted data words were not manipulated in case of the comparison resulting in a match, and
wherein each of the providing means, the decrypting means, the redundancy forming means, the encryption means, the processing means and the comparison means comprises a hardware implementation.

19. A computer system for a secure handling of datasets, comprising:
an encryption/decryption means for non-linearly forming, word by word, encrypted data words from data words of a dataset, for forming a separate encrypted redundancy data word from a redundancy data word associated with the data words and for forming a new encrypted redundancy data word from a new redundancy data word, wherein the encryption/decryption means is further implemented to non-linearly form, word by word, decrypted data words from encrypted data words;
a redundancy forming means for forming the redundancy data word from the data words and for forming the new redundancy data word from the decrypted data words;

a processing means which is implemented to discard predetermined bits of the encrypted redundancy data word to form a reduced encrypted redundancy data word and to discard predetermined bits of the new encrypted redundancy data word to form a reduced new encrypted redundancy data word; and a comparison means for performing at least a partial comparison between the encrypted redundancy data word and the new encrypted redundancy data word, wherein the computer system is configured to assume that the encrypted data words were not manipulated in case of the comparison resulting in a match, and wherein each of the encryption/decryption means, the redundancy forming means, the processing means and the comparison means comprises a hardware implementation.

20. The device according to claim 1, wherein the redundancy former is implemented to determine the redundancy word by use of a first function of the data words of the dataset, and the encrypter is implemented to perform the non-linear encryption function, wherein the first function and the non-linear encryption function do not have distributivity.

21. The device according to claim 6, wherein the redundancy former is implemented to determine the new redundancy data word by use of a first function of the decrypted data words, the encrypter is implemented to perform the non-linear encryption by means of a non-linear first mapping, and the decrypter is implemented to perform the non-linear decryption function, wherein the first function and the non-linear decryption function do not have distributivity.

22. The device according to claim 6, wherein
the decrypter is implemented to non-linearly decrypt the encrypted data words of the encrypted dataset into the decrypted data words, and
the encrypter is implemented to non-linearly encrypt the new redundancy data word into the new encrypted redundancy data word.

23. The method according to claim 22, wherein
the decrypting the encrypted data words of the encrypted dataset is performed by non-linear decryption of the encrypted data words into the decrypted data words, and
the encrypting the new redundancy data word is performed by non-linear encryption of the new redundancy data word into the new encrypted redundancy data word.

24. The non-transitory computer readable storage medium according to claim 16, wherein
the decrypting the encrypted data words of the encrypted dataset is performed by non-linear decryption of the encrypted data words into the decrypted data words, and
the encrypting the new redundancy data word is performed by non-linear encryption of the new redundancy data word into the new encrypted redundancy data word.

25. The device according to claim 18, wherein
the decrypting means is implemented to non-linearly decrypt the encrypted data words of the encrypted dataset into the decrypted data words, and
the encryption means is implemented to non-linearly encrypt the new redundancy data word into the new encrypted redundancy data word.

26. The device according to claim 1, wherein the encrypter is implemented to perform the non-linear encryption of the data words into the separate encrypted data words word by word and the encryption of the redundancy data word into a separate encrypted redundancy data word using a common non-linear mapping from a domain of the data words to a codomain of the encrypted data words for the data words and the redundancy data word.

27. The device according to claim 6, wherein the decrypter is implemented to perform the non-linear decryption of the encrypted data words into the decrypted data words word by word using a common non-linear mapping from a domain of the data words to a codomain of the encrypted data words for the encrypted data words.

28. The method according to claim 13, further comprising storing the encrypted data words and the encrypted redundancy data word into a memory or transmitting the same via a data bus after processing, wherein the predetermined bits to be discarded are not stored and transmitted, respectively.

29. The non-transitory computer readable storage medium according to claim 15, wherein the method further comprises storing the encrypted data words and the encrypted redundancy data word into a memory or transmitting the same via a data bus after processing, wherein the predetermined bits to be discarded are not stored and transmitted, respectively.

* * * * *